United States Patent [19]

Junkers

[11] Patent Number: 5,311,796

[45] Date of Patent: * May 17, 1994

[54] HYDRAULIC TOOL

[76] Inventor: John K. Junkers, 7 Arrowhead La., Saddle River, N.J. 07458

[*] Notice: The portion of the term of this patent subsequent to May 21, 2008 has been disclaimed.

[21] Appl. No.: 557,166

[22] Filed: Jul. 23, 1990

[51] Int. Cl.⁵ ............................................. B25B 13/06
[52] U.S. Cl. ................................. 81/57.39; 137/580
[58] Field of Search ..................... 81/57.39; 137/580

[56] References Cited

U.S. PATENT DOCUMENTS

| | | | |
|---|---|---|---|
| 4,671,142 | 6/1987 | Junkers | 81/57.39 |
| 4,823,835 | 4/1989 | Chu | 137/580 X |
| 4,921,010 | 5/1990 | Spirer | 137/580 |

Primary Examiner—James G. Smith
Attorney, Agent, or Firm—Michael J. Striker

[57] ABSTRACT

A hydraulic tool comprises an action part arranged to act on a threaded connector for tightening and loosening the same, a drive part arranged to operate the action part so that the action part tightens or loosens a threaded connector, the drive part being formed as a hydraulically-operated drive, hose units arranged to supply a hydraulic working liquid to the drive, and a connector connecting the hose units with the drive, the connector including a first connector portion mounted on one of the parts turnably relative to the latter about a first axis, and a second connector portion mounted on the first connector portion turnably about a second axis which is inclined at an angle relative to the first axis.

3 Claims, 1 Drawing Sheet

HYDRAULIC TOOL

BACKGROUND OF THE INVENTION

The present invention relates generally to hydraulic tools and more particularly to hydraulically operated torque tools.

Hydraulically operated torque tools are known and widely used for tightening or loosening threaded connectors. A known hydraulically operated torque tool has an active part which engages and turns the threaded connector, and a drive part which drives the active part under the action of a working liquid. The drive part is usually formed as a cylinder-piston unit which is supplied with the hydraulic liquid from a source. Since during the operation the cylinder-piston unit performs a forward stroke and a reverse stroke, the working fluid must be supplied alternatingly to opposite chambers of the cylinder at opposite sides of the piston of the cylinder-piston unit. For this purpose the cylinder is usually provided with two passages having first ends which open into the chambers at opposite sides of the piston, and second ends connected by two hoses with a source of the working liquid. The connection of the second ends of the passages with the hoses is performed through swivel connectors. This swivel connector has two parts which are swivelable relative to one another so as to prevent mingling of the hoses during operation of the tool which very often resulted in mingling of the hoses in the older tools. While the swivel connector in accordance with this patent is better than the previously used swivel connectors, it does not completely eliminate the problem of hose interference with the operation during manipulations with the tool.

SUMMARY OF THE INVENTION

Accordingly, it is an object of the present invention to provide a hydraulic tool which which avoids the disadvantages of the prior art.

More particularly, it is an object of the present invention to provide a hydraulic tool which is connected with a source of a hydraulic working liquid so that it can be manipulated in any desirable manner without interference by hoses connecting the source to the tool.

In keeping with these objects and with others which will become apparent hereinafter, one feature of the present invention resides, briefly stated, in a hydraulic tool which has an action part arranged to act on a threaded connector to be tightened or loosened, a hydraulically operated drive part arranged to act on the action part so that the latter tightens or loosens a threaded connector and a connector for connecting the drive part with the source of a hydraulic working liquid, wherein the connector has a first connector portion which is mounted on one of said parts turnably about a first axis, and a second connector portion which is mounted on the first connector portion turnably about a second axis which extends at an angle relative to the first axis.

When the hydraulic tool is designed in accordance with the present invention, it is easier to manipulate without interfering by hoses connected to a source of the hydraulic working fluid on the one hand, and to the connector on the other hand.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 2:
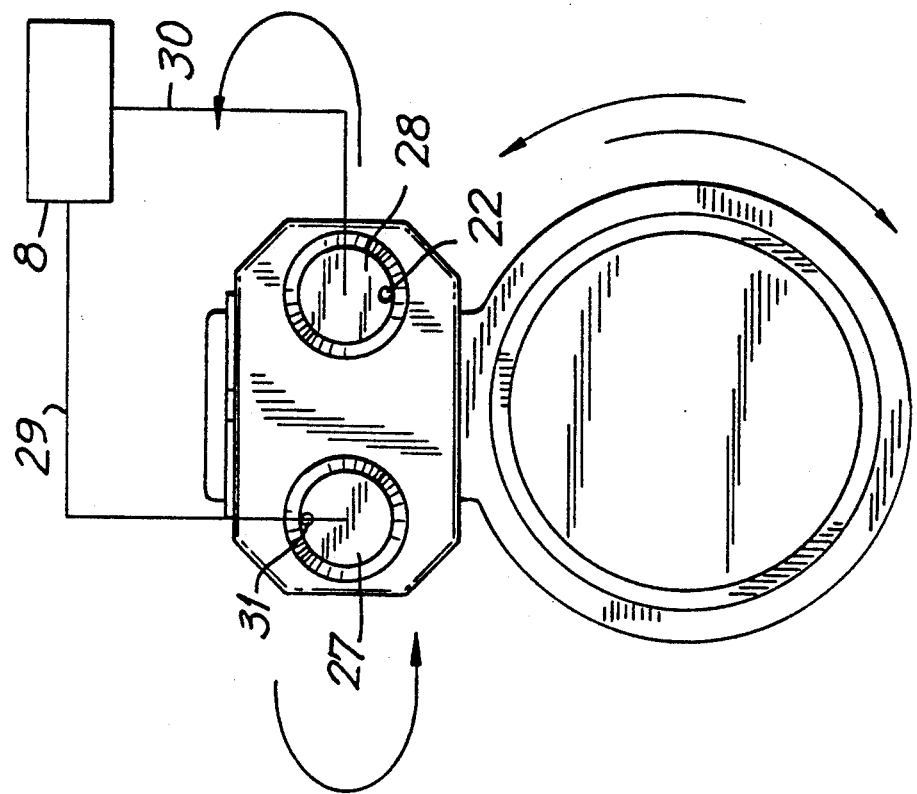
FIG. 2 is an end view of the hydraulic tool of FIG. 1.
Figure 1:
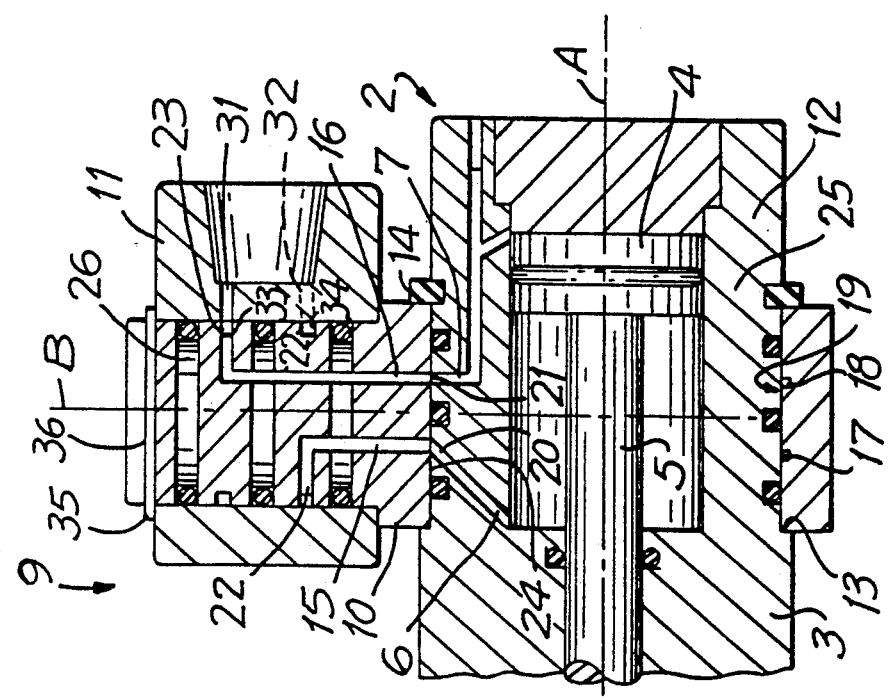
FIG. 1 is a side view of a hydraulic tool in accordance with the present invention.

A hydraulic tool in accordance with the present invention has an action part which is identified with reference numeral 1. The action part can be formed in a known manner as in other hydraulically operated tools and especially tool wrenches. In other words, it can have a ratchet-pawl unit with a ratchet having a hexagonal opening or a formation for attaching a socket, and a pawl engaging the ratchet and turnable together with a drive link as disclosed for example in U.S. Pat. No. 4,825,730. The hydraulic tool further has a drive part identified as a whole with reference numeral 2 and formed as a hydraulically operated cylinder-piston unit. The drive part 2 has a cylinder identified with reference numeral 3, a piston 4 movable in the cylinder 3 and provided with a piston rod 5 which is connected with the drive link carrying the pawl. During the operation of the hydraulic drive unit and respective displacement of the piston, the drive link together with the pawl are turned in respective directions so as to turn the ratchet with the engaging formation and correspondingly turn a threaded connector. The cylinder 3 of the cylinder-piston unit has two chambers formed at opposite sides of the piston 4. For displacing the piston in respective directions, the cylinder is provided with passages 6 and 7 which extend to the respective chambers of the cylinder and through which a hydraulic working liquid can be supplied from a source of the hydraulic working liquid. Depending on whether the hydraulic working liquid is supplied through the passage 6 or through the passage 7 the piston is moved in a corresponding direction and as a result the ratchet is turned in a corresponding direction to tighten or loosen a threaded connector.

The passages 6 and 7 are connected with a source of the hydraulic working liquid 8 through a connector which is identified as a whole with reference numeral 9. The connector 9 has a first connector portion 10 and a second connector portion 11. The first connector portion is seated on a cylinder part 12 which has a smaller diameter than the remaining part of the cylinder. The first connector portion 10 abuts against a shoulder 13 formed between the portion 12 and the remaining portion of the cylinder 3 and is retained in this position by a retaining ring 14. The first connector portion 10 is rotatably arranged on the cylinder part 12. The first connector portion 10 is provided with passages 15 and 16. The passages 15 and 16 have outlets 17 and 18 which are formed as annular grooves provided on an inner surface 19 of the connector portion 10. The outlets 17 and 18 of the passages 15 and 16 coincide with the inlets 20 and 21 of the passages 6 and 7 in the cylinder 3. The passages 15 and 16 also have inlet portions 22 and 23 which are formed as annular grooves provided on the outer surface of the connector portion 10. More particularly, while the outlets 17 and 18 of the passages 15 and 16 are formed so that they open into an inner opening 24 of an annular section 25 of the connector portion 10, the inlets 22 and 23 are open on the outer surface of a cylindrical section 26 of the connector portion 10.

The second portion 11 of the connector 9 has inlets 27 and 28. Hoses 29 and 30 extend from the source of the hydraulic working liquid 8 and their opposite ends are inserted into the inlets 27 and 28. Passages 31 and 32 extend from the inlets 27 and 28 in the second connector portion 11 and their outlets 33 and 34 coincide with the inlets 22 and 23 of the passages 15 and 16 of the first connector portion 10. The second connector portion 11 is arranged turnably on the first connector portion 10 and retained on the latter by a retaining ring 35 which is received in a groove 36 formed in the first connector portion 10.

While the first connector portion 10 is mounted on the drive part 2 of the hydraulic tool turnably about a first axis A, the second connector portion 11 is mounted on the first connector portion 10 turnably about an axis B which extends at an angle relative to the axis A. In the shown embodiment the angle between the axes A and B is 90°; however, it can also be different. In the shown embodiment the connector portion 10 is mounted on the drive part 2 or on the cylinder 3 of the drive part; however, it can be also mounted on another part of the tool. As can be seen from the drawing, a plurality of sealing means are provided on the respective locations, such as for example the seals between the connector portion 10 and the drive part 2, the seals between the connector portion 11 and the connector portion 10, etc.

When the hydraulic tool in accordance with the present invention is completely assembled with the first connector portion 10 mounted on the drive part 2, the second connector portion 11 mounted on the first connector portion 10, and the hoses 29 and 30 connected with the second connector portion 11 and with the source of the hydraulic working liquid 8, tightening or loosening of threaded connectors can be performed by the action of part 1. During operation of the tool and any manipulations with the tool to reach respective threaded connectors, the probability of the interference of the hoses with the manipulations by the tool is minimal.

It will be understood that each of the elements described above, or two or more together, may also find a useful application in other types of constructions differing from the types described above.

While the invention has been illustrated and described as embodied in a hydraulic tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic tool, comprising an action part arranged to act on a threaded connector for tightening and loosening the same; a drive part arranged to operate said action part so that said action part tightens or loosens a threaded connector, said drive part being formed as a hydraulically-operated drive and including a hydraulic cylinder-piston unit having a first axis; hose means arranged to supply a hydraulic working liquid to said drive; and a connector connecting said hose means with said drive part, said connector including a first connector portion mounted on one of said parts turnably relative to the latter about said first axis of said hydraulic cylinder-piston unit; and a second connector portion mounted on said first connector portion turnably about a second axis which is inclined substantially perpendicularly relative to said first axis of said hydraulic cylinder-piston unit, so that said hose means are turnable relative to said one part about said first axis of said hydraulic cylinder-piston unit and also about said second axis which is substantially perpendicular to said first axis of said hydraulic cylinder-piston unit, said hose means including two hoses each having one end connectable with a source of hydraulic working liquid and another end connected with said connector, so that the other ends of said two hoses are jointly turnable about said first axis of said hydraulic cylinder-piston unit and also about said second axis which is substantially perpendicular to said first axis.

2. A hydraulic tool as defined in claim 1, wherein one end said second connector portion having two second passages each has an inlet and an outlet, said first connector portion having two first passages each having an inlet and an outlet, the other ends of said hoses being connected with said inlets of said second passages of said second connector portion, while said outlets of said second passages of said second connector portion are connected with said inlets of said first passages of said first connector portion.

3. A hydraulic tool as defined in claim 2, wherein said hydraulic cylinder-piston unit has a cylinder, a piston movable in said cylinder, and two chambers formed at opposite sides of said piston in said cylinder, said outlets of said first passages of said first connector portion being connected with said chambers, respectively.

* * * * *